United States Patent [19]
Madden et al.

[11] Patent Number: 5,477,955
[45] Date of Patent: Dec. 26, 1995

[54] CONVEYING SYSTEM FOR FOODSTUFFS

[75] Inventors: Ian R. Madden, Bacchus Marsh; Charles E. Esson, Ballarat; Peter G. Brown, Mulgrave, all of Australia

[73] Assignee: Colour Vision Systems Pty. Ltd., Australia

[21] Appl. No.: 211,771
[22] PCT Filed: Oct. 15, 1992
[86] PCT No.: PCT/AU92/00551
  § 371 Date: Jun. 15, 1994
  § 102(e) Date: Jun. 15, 1994
[87] PCT Pub. No.: WO93/07972
  PCT Pub. Date: Apr. 29, 1993

[30] Foreign Application Priority Data

Oct. 15, 1991 [AU] Australia ................. PK8911

[51] Int. Cl.⁶ .................................................. B65G 47/46
[52] U.S. Cl. .................. 198/370.04; 198/370.05; 198/706; 198/779; 198/803.01; 209/912
[58] Field of Search ..................... 198/365, 370, 198/477.1, 706, 779, 803.01, 370.04, 370.05; 209/515, 648, 698, 912

[56] References Cited

U.S. PATENT DOCUMENTS

| | | |
|---|---|---|
| 1,633,002 | 6/1927 | Cutler . |
| 1,644,052 | 10/1927 | Cutler . |
| 3,286,811 | 11/1966 | McWilliams ............... 198/365 |
| 3,857,472 | 12/1974 | Klint ......................... 198/477.1 |
| 4,586,135 | 5/1986 | Horii ......................... 198/365 |
| 4,961,489 | 10/1990 | Warkentin ................. 198/365 |
| 5,024,047 | 6/1991 | Leverett .................... 209/912 |
| 5,101,982 | 4/1992 | Gentili ....................... 198/779 |
| 5,244,100 | 9/1993 | Regier et al. .............. 198/365 |
| 5,267,654 | 12/1993 | Leverett .................... 209/912 |
| 5,294,004 | 3/1994 | Leverett .................... 198/365 |

FOREIGN PATENT DOCUMENTS

| | | |
|---|---|---|
| 23905/84 | 10/1986 | Australia . |
| 53859/86 | 1/1987 | Australia . |
| 2351718 | 12/1977 | France . |
| 3013315 | 3/1981 | Germany . |

Primary Examiner—Joseph E. Valenza
Attorney, Agent, or Firm—Larson and Taylor

[57] ABSTRACT

A conveying system (10) for the classification and sorting of foodstuffs comprising a conveyor (11) comprising at least one endless chain (15) driven by spaced apart drive sprockets (12 and 13), a plurality of chain clips (40) moulded in plastics and clipped to the links (20) of the chain, each chain clip (40) pivotally supporting a least one elongate conveyor finger (60), a conveying surface forming part of the conveyor finger to locate the foodstuff, each elongate conveyor finger having a downwardly extending leg (65) having a latch that cooperatively engages with a projection of the chain link, the conveying system including a series of discharge zones positioned along the conveyor with an ejection means position adjacent to each discharge zone.

13 Claims, 9 Drawing Sheets

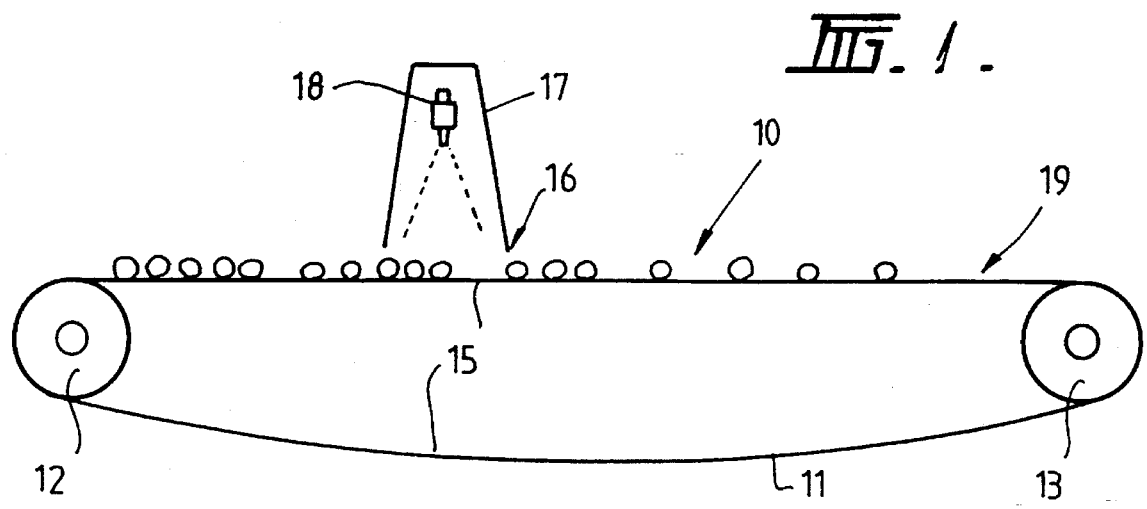
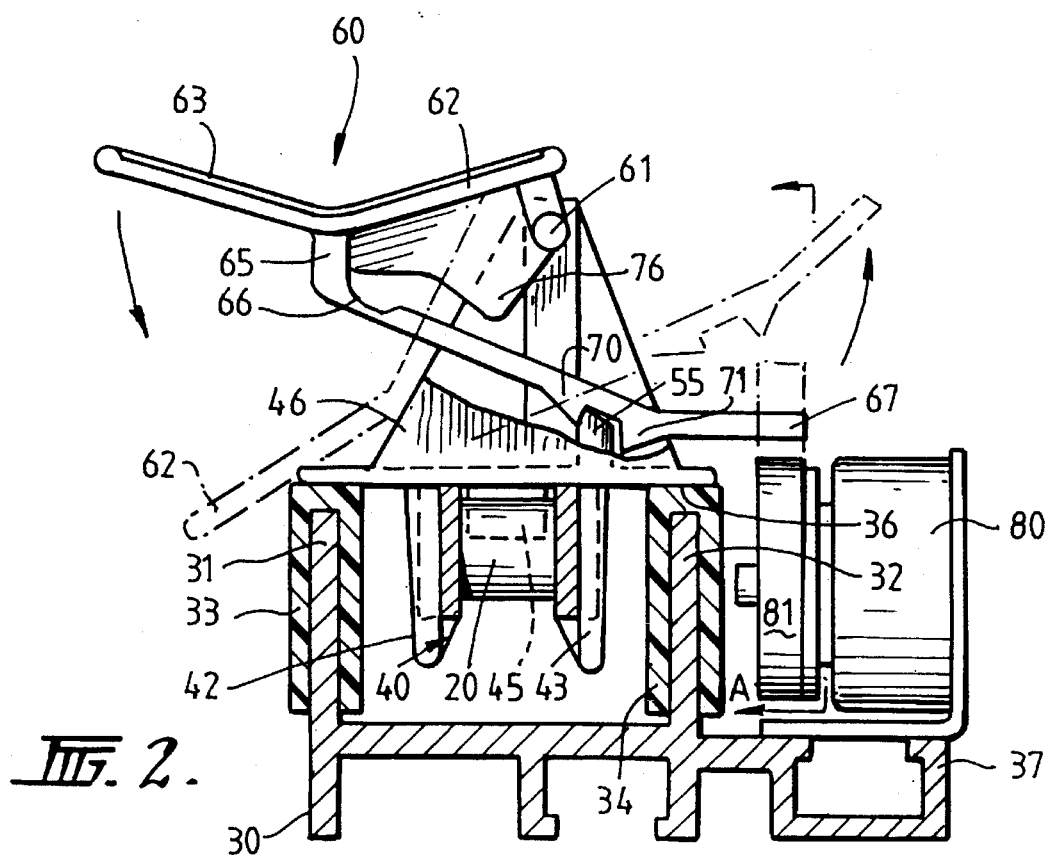

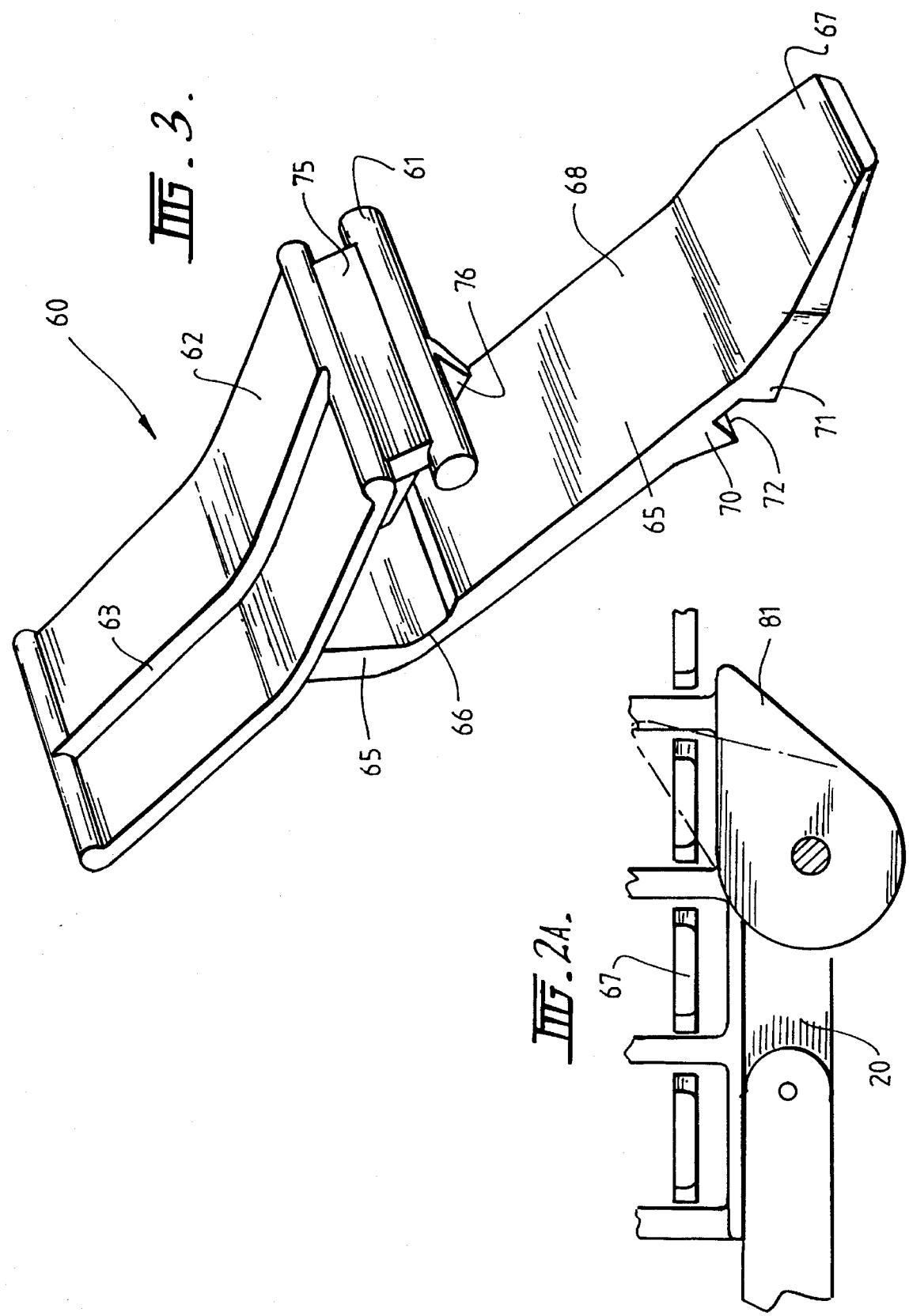

CONVEYING SYSTEM FOR FOODSTUFFS

FIELD OF THE INVENTION

This invention relates to a conveying system and in particular to components of a conveyor for use to sort, size or weigh a variety of fruits and vegetables. This invention also relates to the method and apparatus disclosed in the applicant's co-pending patent application PCT/AU90/00464.

SUMMARY OF PRIOR ART

In Australian patent 555,764 there is disclosure of a fruit conveying system that comprises an endless conveyor chain constrained to move along a guide path, a plurality of attachments are mounted on the conveyor chain, with a plurality of holders on the attachments. Slat like receiving plates are pivotally mounted on the holders, and an engaging mechanism is provided for each receiving plate to hold the plate in a generally horizontal position. A discharge operating mechanism includes an operating lever selectively actuatable to release the engagement of the engaging mechanisms with the associated receiving plates allowing the plates to pivot to downwardly directed positions. This conveyor is used for the sorting and sizing of fruit and has the capacity to discharge sorted fruit at predetermined positions along the length of the conveyor.

The component parts of the conveyor disclosed in Australian patent 555,764 are complicated in design and construction and thus expensive to produce, assemble and maintain. The present invention is concerned with a conveying system that incorporates a conveyor that is considerably simpler in designed construction.

SUMMARY OF THE INVENTION

According to one aspect of the present invention there is provided a support and discharge mechanism for use with a conveyor that sorts, sizes and/or weighs foodstuffs, the mechanism comprising a carriage moulded in plastics and adapted to clip onto a link of a chain of the conveyor, the carriage pivotally supporting a support platform adjacent one edge of the platform, the platform being adapted to support foodstuffs to be transported by the conveyor, the platform having an integrally formed downwardly extending leg that resiliently clips onto the carriage, the leg terminating in a projecting foot whereby an upward force on the foot causes the leg to resiliently disengage from the carriage causing the platform to pivot downwardly relative to the carriage to discharge foodstuffs supported by the platform.

According to a further aspect of the present invention there is provided a conveying system for the classification and sorting of foodstuffs comprising a conveyor that defines at least a single line of spaced apart foodstuffs, the conveyor comprising at least one endless chain driven by spaced apart drive sprockets, a plurality of chain clips moulded in plastics and clipped to the links of the chain, each chain clip including means to pivotally support at least one elongate conveyor finger, a conveying surface means either forming part of the conveyor finger or being attached to at least one of the conveyor fingers, the conveying surface means being adapted to locate the foodstuff, each elongate conveyor finger having a downwardly extending leg having a latch that cooperatively engages with a projection of the chain link, the conveying system including a series of discharge zones positioned along the conveyor with an ejection means positioned adjacent to each discharge zone, the conveying system including means to photograph the foodstuffs whilst being conveyed on the conveyor the means to present signals to the ejection means to discharge foodstuffs at predetermined locations, the ejection means comprising means to engage the leg of the conveyor finger to release the latch causing the conveying finger to pivot downwardly of the chain clip to discharge foodstuff positioned on the conveying surface means.

Preferably the chain clip and conveyor finger comprise single plastics mouldings. In a preferred embodiment the leg is resiliently mounted to the conveying surface of the conveyor finger. In a preferred embodiment the pivotal mounting of the conveyor finger to the chain clip is offset so that release of the latch causes the conveyor finger to pivot downwardly to effect release of foodstuff supported thereon.

In a preferred embodiment the conveying surface of each conveyor finger is dished and is provided with a raised upwardly extending transverse rib that assists to locate foodstuff to prevent movement of foodstuff as the conveyor operates.

Another feature of the preferred embodiment concerns the provision of a stop defined by the conveyor finger, the stop being positioned to restrict upward displacement of the leg when engaged by the engagement means.

DESCRIPTION OF THE DRAWINGS

Embodiments of the present invention will now be described by way of example only with reference to the accompanying drawings in which:

FIG. 1 is a schematic side-on view of a conveying system for use in the sizing and sorting of fruit and vegetables, FIG. 2 is a cross-sectional view through the conveyor illustrating the inter-relationship of a conveyor chain clip and conveyor finger, FIG. 2A is a cross-sectional view taken along the lines A—A of FIG. 2, FIG. 3 is a perspective view of a conveyor finger.

DESCRIPTION OF THE PREFERRED EMBODIMENTS

Figure 4:
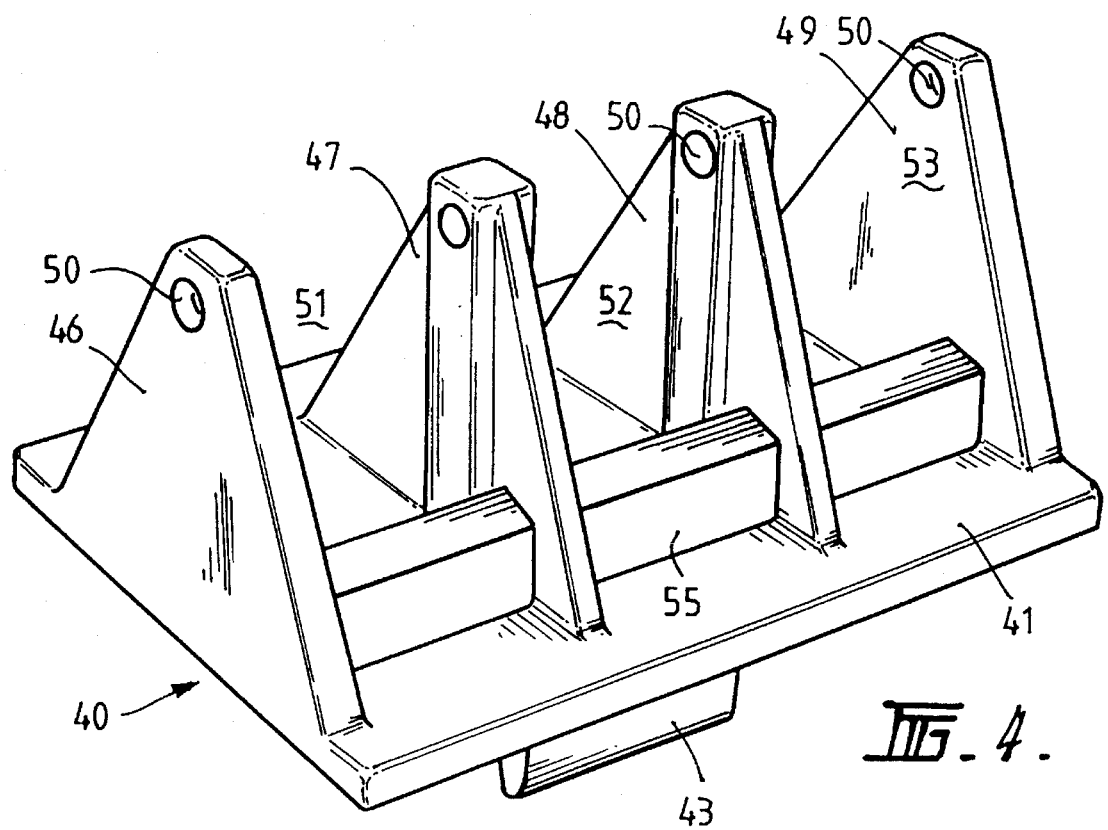
FIG. 4 is an upper perspective view of a chain link clip.
Figure 5:
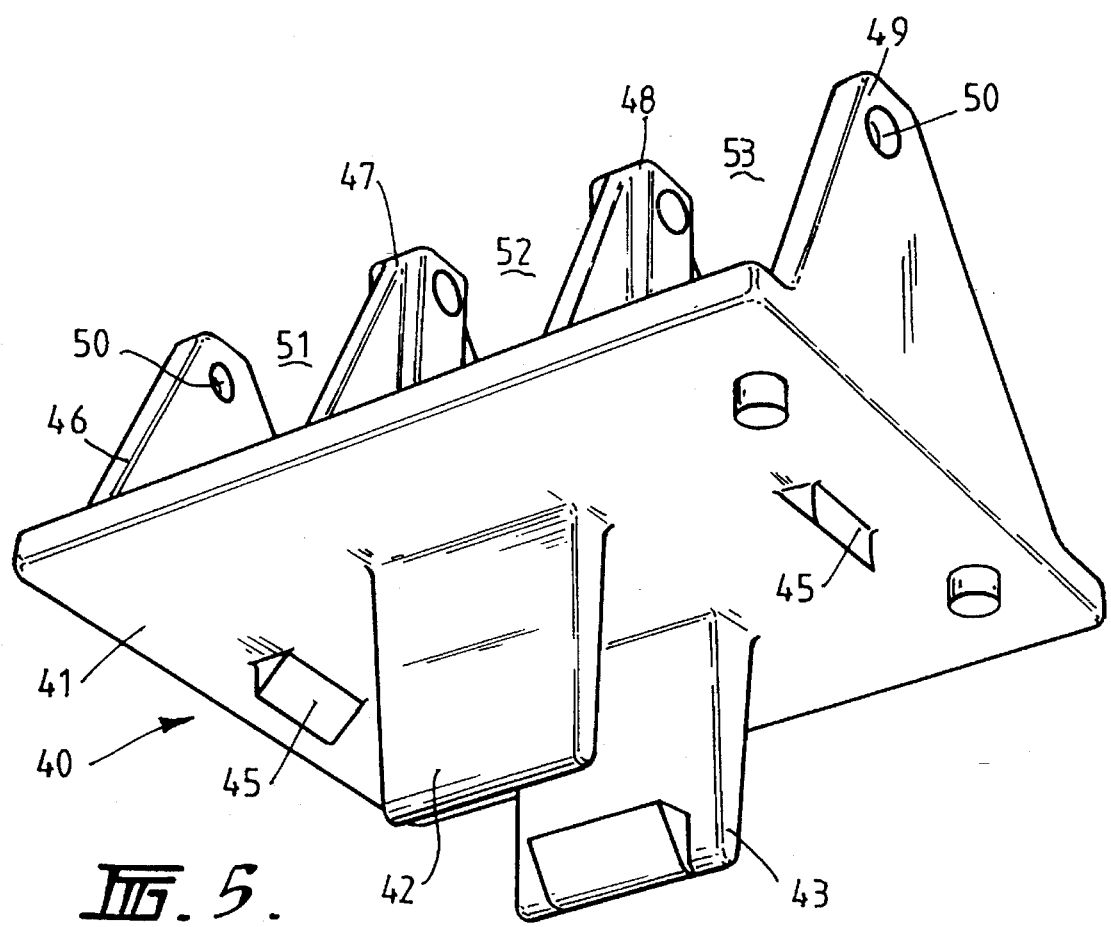
FIG. 5 is an under perspective view of a chain link clip.

The conveying system 10 used to size, sort and in some cases weigh, fruit and vegetables is shown schematically in FIG. 1 and in cross-section in FIG. 2. The system comprises an endless conveyor 11 driven between two spaced apart drive sprockets 12 and 13. Whilst throughout the specification the conveyor is restricted to a single path, it is understood that the conveyor may comprise one or more endless conveyors arranged to define parallel paths. The conveyor 11 includes an endless chain 15 driven between the drive sprockets 12 and 13 and comprises a series of interconnected chain links 20. The chain is known as a standard C2060H. As shown in FIG. 2, the conveyor system is supported on an aluminium extrusion 30 that has parallel upstanding wall portions 31 and 32 that support extruded plastics cover members 33 and 34. The cover members define elongate bearing surfaces 35 and 36 on which the underside of a plurality of chain clips 40 can run. Each chain clip 40, illustrated in detail in FIGS. 4 and 5 is attached to each inner chain link 20. Each chain clip 40 supports three conveying fingers 60 defined hereafter as piano keys. The piano keys 60 are pivotally secured to the chain clip 40 and operate to define the support surface of the conveyor whilst including means to cause the fruit or vegetables to be ejected from the conveyor. The piano keys 60 are illustrated in particular detail with reference to FIGS. 2 and 3.

As shown in schematically in FIG. 1, the conveying system also incorporates a photographic zone 16 in the form of a camera box 17 that is positioned above the path of the conveyor. The camera box contains a CCD camera 18 which is in turn coupled to a computer, not shown. The design and operation of the CCD camera and its association with the computer is described in more detail in the applicant's co-pending patent application PCT/AU90/00464. The disclosure of this application is incorporated herein by reference.

The conveyor system is designed to handle a variety of fruits and vegetables of greatly different shapes and sizes. Such foodstuffs include citrus and stone fruits, cucumbers, capsicums and mangoes.

The fruit is fed onto the conveyor by a feed conveyor not shown. The feed conveyor ensures that each fruit is placed spaced apart on the conveyor surface. As the fruit passes under the camera 18, its size, shape, colour and location are determined. The computer allocates each fruit an outlet and triggers an ejection means to tipoff the fruit at a predetermined position into collection bins. This area of the conveyor system is shown as the exit area 19 in FIG. 1.

Each chain clip 40 is injection moulded in plastics and as shown in FIGS. 4 and 5 comprises a planar running surface 41 with a pair of downwardly extending clip portions 42 and 43. As shown in FIG. 2, the clip portions 42 and 43 engage a chain link 20. The underside of the running surface 41 is also provided with downward projecting members 45 that assist the location of the clip 40 on the chain link 20 and ensure positive drive through the chain link 20 to the chain clip 40. The upper surface of the chain clip 40 is provided with four upwardly extending webs 46, 47, 48 and 49 of triangular configuration. The upper end of the webs are provided with coaxial holes 50 extending therethrough.

The upstanding webs 46–49 define three cavities 51, 52 and 53 each of which is arranged to accommodate a conveyor finger or a piano key 60. Each piano key includes a stub-axle 61 that is arranged to locate in the holes 50 be a rotatable fit across adjacent webs. Each piano key 60 is also injection moulded in plastics and comprises as shown in FIG. 3 a dished conveying portion 62 that has a raised rib 63 extending transversely of the centre of the conveying portion 62. The dished profile of the conveying portion 62 as shown in FIG. 3 presents a concave surface to the exterior. The concave surface in combination with the transverse raised rib 63 ensures accurate and positive location of fruit and vegetables and ensures that the fruit or vegetables do not move as the conveyor operates.

Each piano key includes flexible leg 65 that extends downwardly from the underside of the dished conveying portion 62. The leg 65 extends transversely to one side of the conveying portion 62 and includes a waisted portion 66 joined to an outwardly extending foot 67 via a median portion 68. The median portion 68 includes a pair of downwardly projecting teeth 70, 71 which define a slot 72 therebetween. Each piano key 60 also includes a web 75 that extends centrally to one side of the conveying portion 62. The web supports the stub-axle 61 and includes a downwardly projecting triangular stop 76. The stop 76 is positioned vertically above the median portion 68 of the leg 65 and acts to limit the upward displacement of the leg 65 about the waisted portion 66.

As shown with particular reference to FIG. 2, each piano key 60 is clipped into position via use of the stub-axles 61 between adjacent webs of the chain clip 40. The stub-axles 61 are positioned to one side of the piano key 60 and the downwardly extending leg 65 is arranged to rest on an upwardly projecting bar 55 on the chain clip 40. The location of the bar 55 within the slot 72 in the median portion 68 of the leg 65 operates as a latch. One side 37 of the aluminium extrusion 30 is provided as a support base for a solenoid 80. As shown in FIG. 2a the solenoid 80 includes a lever 81 which operates to engage the foot 67 of the leg 65 to cause vertical upward displacement which is then limited by engagement of the leg 65 on the stop 76. Upward displacement of the leg 65 causes the teeth 70, 71 to ride clear of the chain clip bar 55 and the mass of the piano key 60 especially when carrying fruit is such that the key 60 pivots on the stub-axle 61 to fall to the position shown in dotted profile in FIG. 2. Once the piano key 60 falls the fruit supported thereon rolls off sideways into a collection bin, not shown. Although not shown in the drawings, it is understood that further down the conveyor there is a suitable ramp mechanism to cause each piano key 60 to be returned to the upright position shown in full profile in FIG. 2.

The assembly described above has the elegance of providing a complicated conveyor system with a minimum of components. The use of a single injection moulding for the chain clip and another injection moulding for the piano key provides the combined functions of a conveying surface, longitudinal location of fruit, a pivot axle, a support arm and a locking mechanism with a spring return. The assembly is strong, durable and provides simple means of support, conveyance and discharge.

As mentioned earlier in the specification the conveying system described above can comprise one or more lanes. The vision processing system includes the CCD camera which may be provided one per lane, two per lane or one per each two lanes. The CCD camera is coupled to a computer and an encoding device. The encoding device is in the form of a shaft encoder and has two outputs. The first output produces a signal for each piano key and the second produces a signal every fourth piano key. The computer comprises a central processing unit (CPU) a vision processor, an object processor and output devices. The number of vision and object processors increases with the number of lanes and cameras. The camera has an electronic shutter to freeze high speed movement and runs at normal synchronised rate for normal PAL or NTSC systems. The red, green, blue (RGB) or the hue, saturation, intensity (HSI) outputs and the synchronised signal from the camera are connected directly to the vision processor as is the second encoder signal which emanates from every fourth piano key.

On the signal from the encoder the vision processor collects the next available image from the camera. The displacement of the conveyor and therefore any fruit in the camera view, caused by the random delay between encoder and camera synchronised signals is calculated in order to locate the fruit accurately with respect to the piano keys. The vision processor then normalises the digitised data to highlight boundaries and colour changes. The normalised data is then transferred to the object processor. The object processor locates fruit boundaries, calculates average diameter, major and minor axes lengths, slenderness ratio and the percentages of various operator definable colours present on the surface of the fruit. This information, along with the exact location of the fruit on the conveyor is transferred to the CPU.

If the fruit on the conveyor are touching or are close together the object processor instructs the CPU to trigger all piano keys under these fruit at the first discharge point. This fruit returns to the infeed of the conveyor. This feature is included because the design of the piano key necessitates space between each fruit to ensure that only the correct fruit fall from the conveyor when the appropriate piano keys are tripped by the discharge mechanism.

The CPU compares dimensional information and colour data with operator selectable values to determine size, grade and discharge allocation. The first output from the encoder (each piano key) is used by the CPU to track the location of fruit assigned to discharge points and to trigger the appropriate piano keys. The CPU also correlates various aggregates traditionally monitored by human operators.

The conveying system operates at high speed to vision size a wide range of fruit/vegetables at speeds of up to fifteen pieces per second. The system is designed to handle such fruit/vegetables as stone fruits, apples, citrus, pears, capsicums, nashi, mangoes, rock melons, avocado and zucchini.

In the embodiments shown in FIG. 6 to 10, the componentry has been further reduced by replacing the three tipping piano keys 60 with a single tipping cup 160 that is pivotally supported between a pair of upstanding webs formed on a modified conveyor chain clip 140. The cup 160 supports fruit in the same manner as the piano fingers did in the first embodiment.

Figure 6:
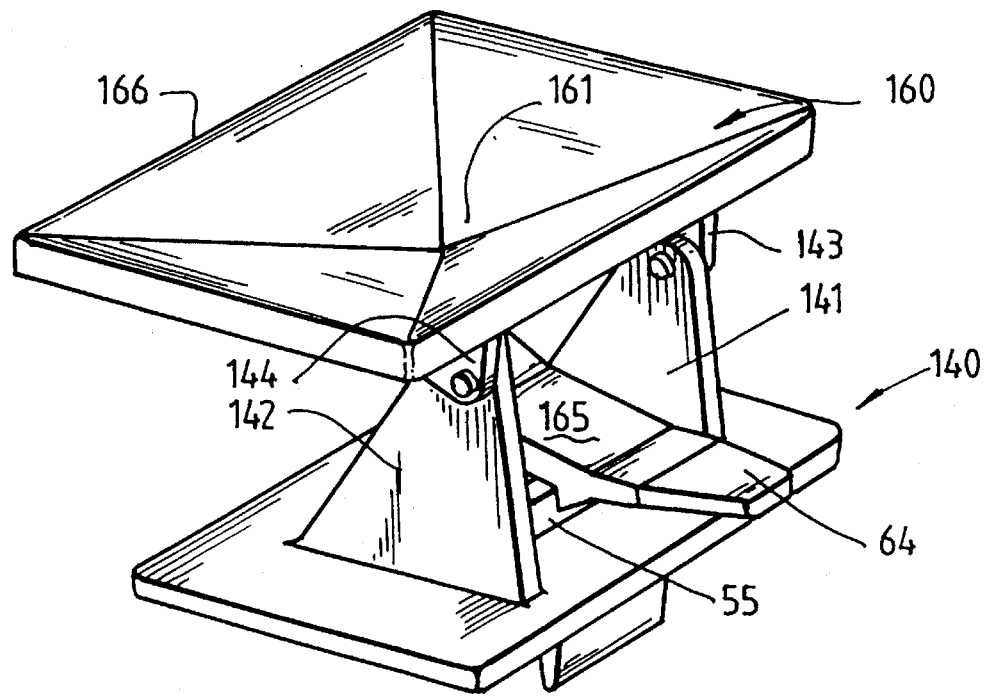
FIG. 6 is a perspective view of a chain link clip supporting a discharge cup.
Figure 7:
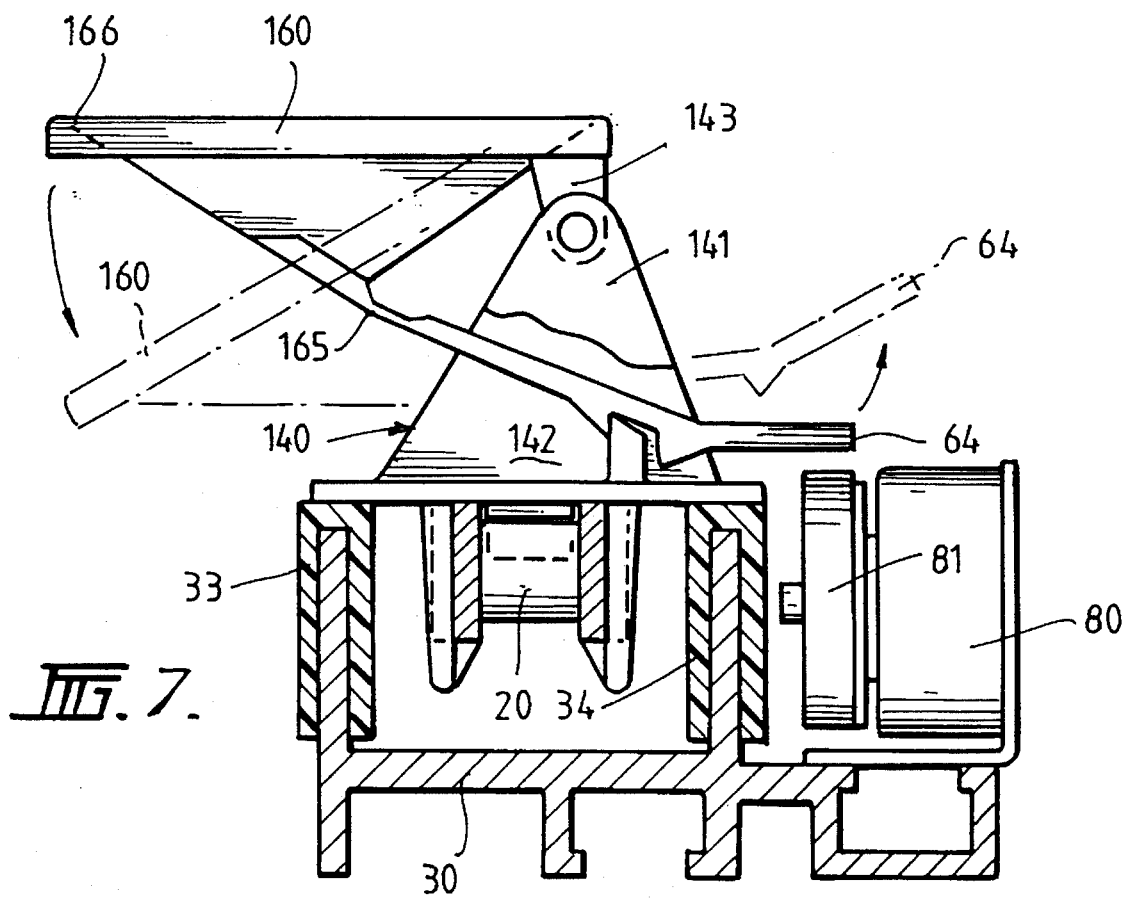
FIG. 7 is a cross-sectional view through the conveyor showing the assembly of the chain clip and discharge cup.

As shown in FIG. 6, the conveyor chain clip 140 has a single pair of upstanding webs 141, 142 that support downwardly extending flanges 143, 144 formed on the underside of a rectangular conveying tipping cup 160. The tipping cup 160 has planar edge portions that taper towards the centre of the cup defining a depression 161 for location of the fruit. As shown in FIGS. 6 and 7, flexible leg 165 depends downwardly from the underside of one lateral edge 166 of the cup 160. The leg 165 is virtually the same as the leg shown in the embodiment illustrated in FIGS. 1 to 5, and operates in the same manner, so that when the solenoid leg 81 displaces the foot 64 of the leg upwardly, the cup 160 tilts downwardly to the dotted profile shown in FIG. 7, causing the fruit contained therein to roll out onto or into suitable collection means (not shown). The spring-loaded operation of the leg 165 is the same as in the first embodiment.

Figure 8:
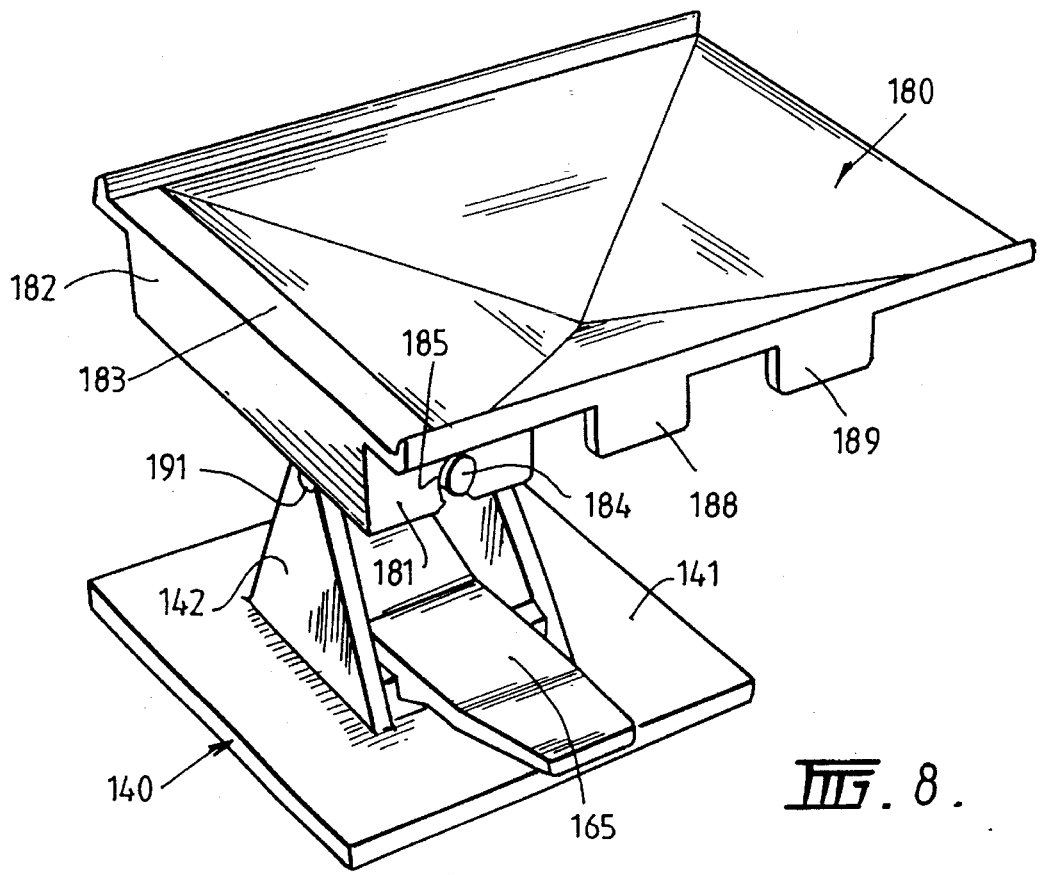
FIG. 8 is a perspective view of a discharge cup mounted on a floating linkage.
Figure 9:
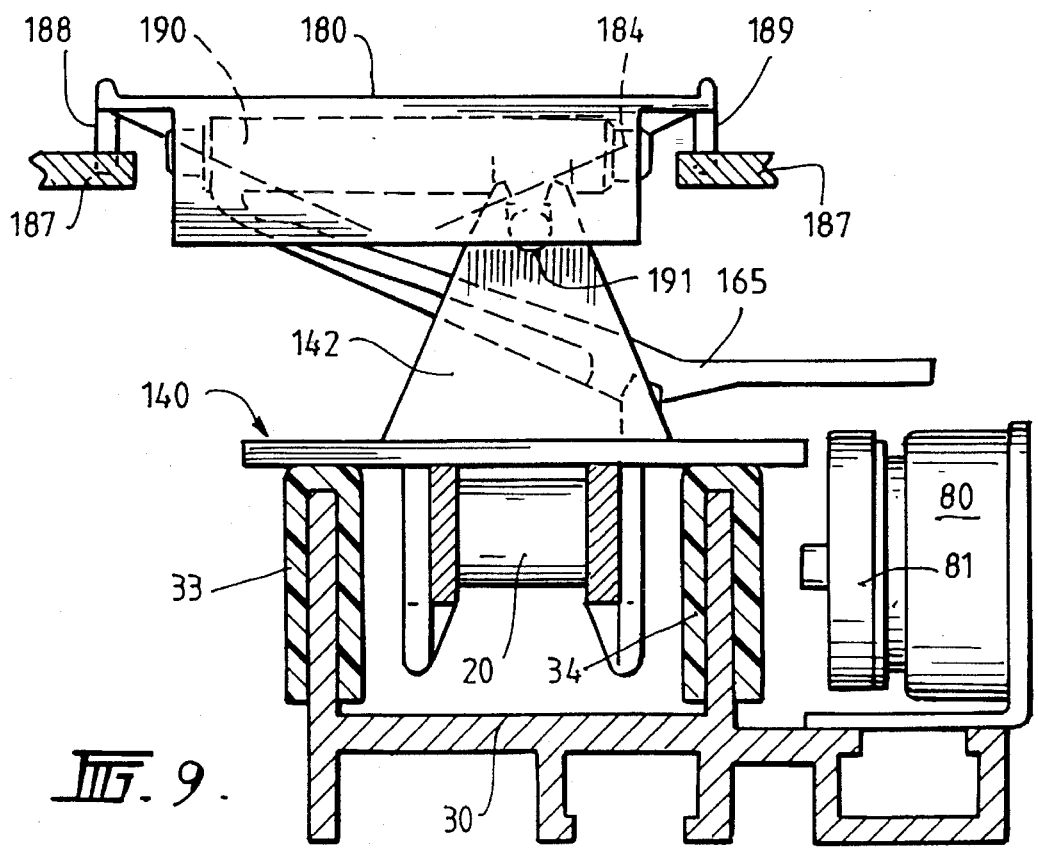
FIG. 9 is a cross-sectional view of the conveyor illustrating the discharge cup and its floating linkage.
Figure 10:
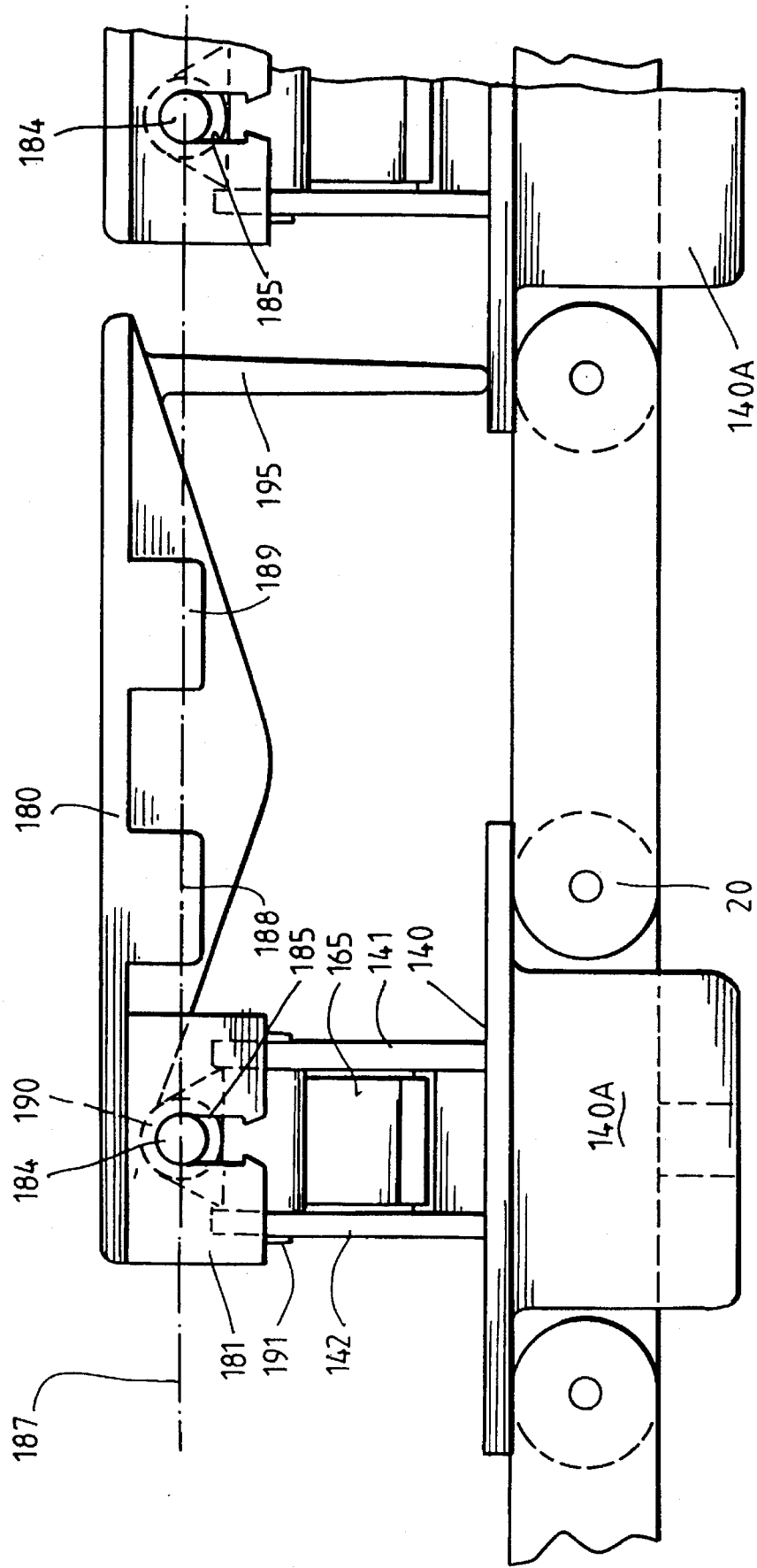
FIG. 10 is a side elevational view of the discharge cup of FIG. 9 taken along the arrow A of FIG. 9.

The embodiment of FIGS. 8 to 10 shows an arrangement in which the weight of the fruit on the cup 160 can be ascertained by the equipment so that each piece of fruit can be weighed. In this embodiment, the cup 180 has downwardly extending flanges 181, 182 positioned on the underside of one edge 183 of the cup. The cup 180 is supported by the flanges 181, 182 on a transverse spindle 184 that floats in slots 185 furnished by the flanges. The spindle 184 forms an integral part of a carriage 190 which is pivotally supported by a stub axle 191 that is mounted between the upstanding webs 141, 142 on the chain clip 140. The spindle 184 extends mutually perpendicular to the stub axle 191, and is integrally secured to one end of the downwardly projecting leg 165. The floating support of the cup 160 on the spindle 184 allows downwardly extending load bearing members 188, 189, positioned in spaced pairs on each side of the cup to ride on a support surface 187 of the conveyor that comprises a weight sensor. The weight of the fruit and cup is borne on each side by the pair of load bearing members 188, 189. As shown by the dotted horizontal line in FIG. 10, the upper surface of the load sensing surfaces 187 of the conveyor is on the same horizontal plane as the axis of the spindle 184. Thus, contact of the load bearing members 188, 189 on the load sensing surfaces 187 lifts the cup so that the spindle is left floating midway along the slots 185. Consequently, all the towing forces are in the same plane as the sliding force on the load sensor thereby effectively eliminating any vertical component of the towing forces on the weighing surfaces. The downwardly projecting leg 65 and carriage 190 operate as in the previous embodiment to cause the leg to tilt upwardly on release by activation of the solenoid, as shown in FIG. 9, causing the carriage and cup to tilt downwardly to the dotted profile shown in FIG. 9. The cup is supported horizontally by a single downwardly extending stem 195 that abuts the adjacent chain clip 140A as shown in FIG. 10. When the cup rides onto the load sensing surfaces 187 the stem 195 is lifted clear of the chain clip 140A to ensure that all of the weight of the cup and its contents is borne by the weight sensors.

Figure 11:
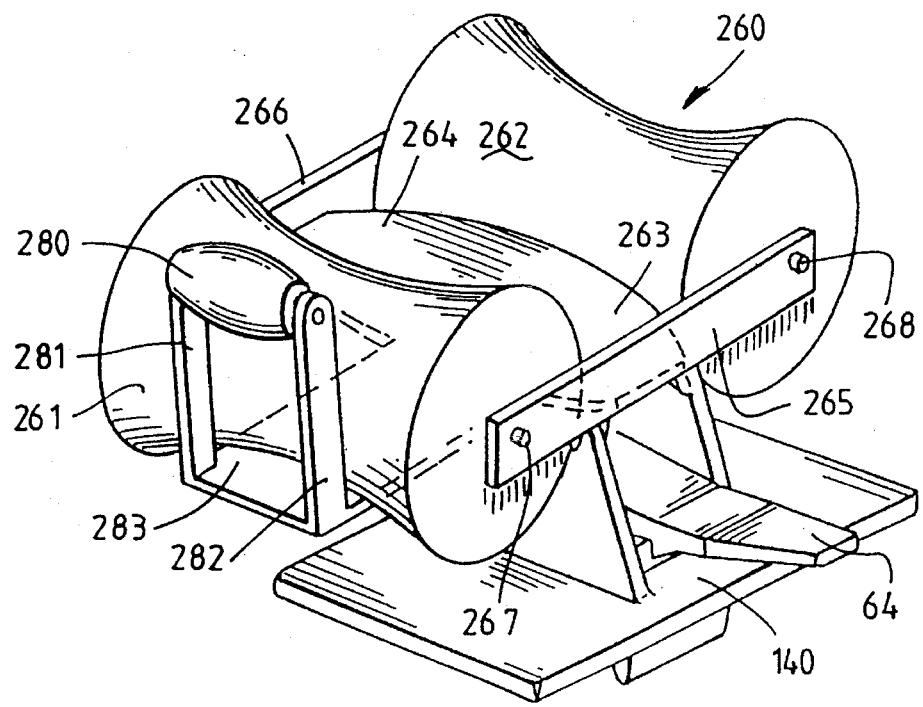
FIG. 11 is a perspective view of a pair of fruit supporting rollers.
Figure 12:
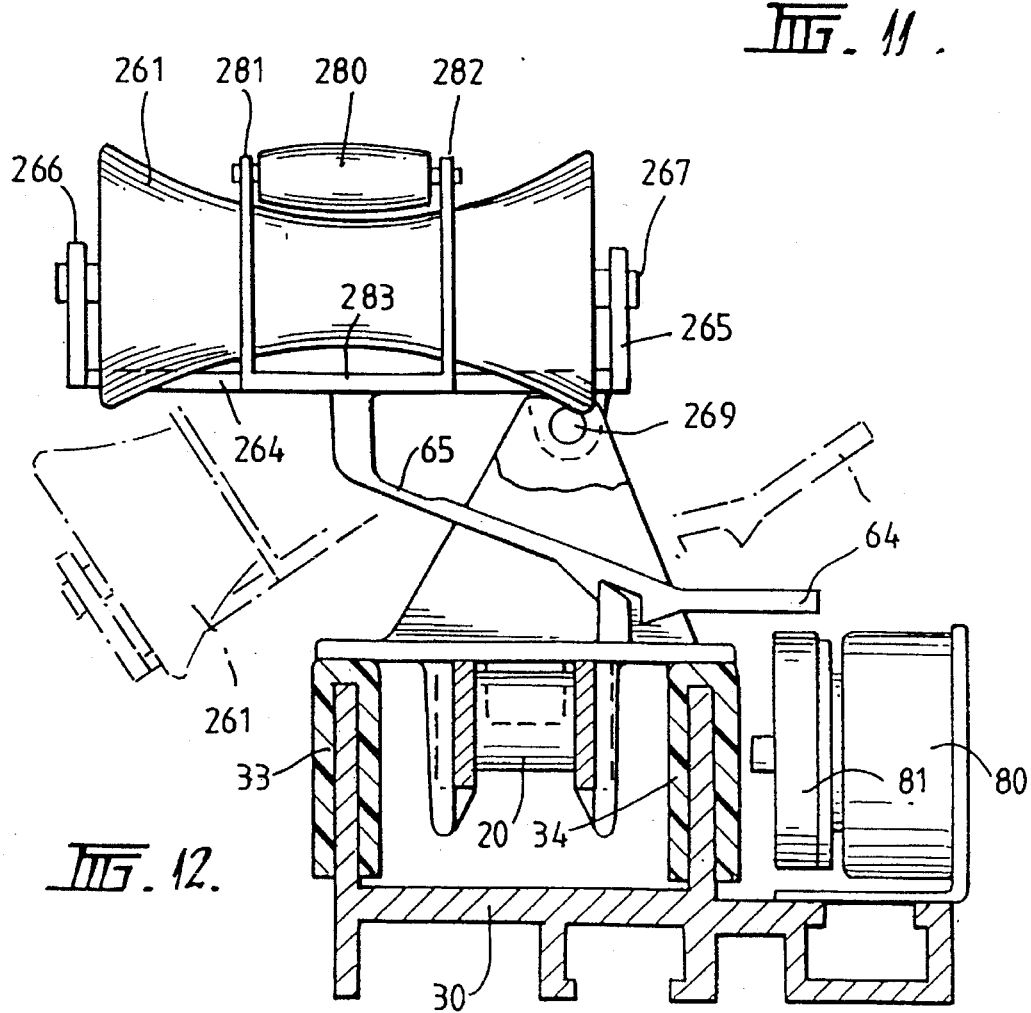
FIG. 12 is a cross-sectional view of the conveyor showing the rollers supported on the conveyor.
Figure 13:
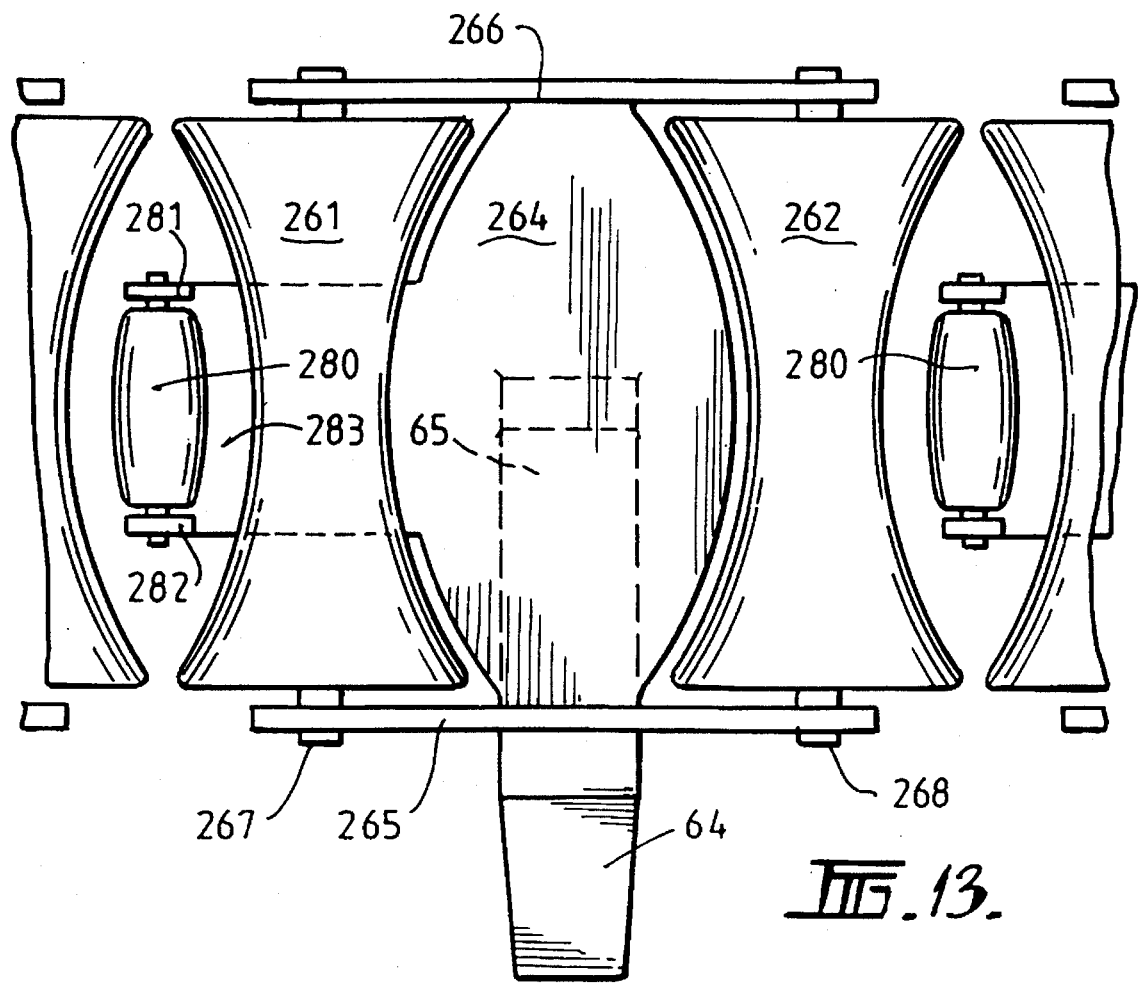
FIG. 13 is a plan view of the rollers when supported by the conveyor.

In the embodiment shown in FIGS. 11, 12 and 13, the cup is in the form of a platform 260 comprising a pair of rollers 261 and 262 positioned adjacent a conveying surface 263. The platform 260 can tip in the same manner as the piano fingers 60 or cup 160 to discharge the fruit. The rollers 261, 262 are axially rotatable to spin the fruit supported thereon so that the camera can view different sides of the fruit.

The tipping platform 260 of FIGS. 11 and 12 comprises a central planar support surface 264 bounded on either side by parallel spaced apart rectangular side panels 265, 266. The side panels, 265, 266 support a pair of spindles 267, 268 at either end that extend between the side panels and support the concave rollers 261 and 262. The rollers 261 and 262 are free to spin about the spindles 267, 268 and are spaced in a manner that their curvature defines a space therebetween into which fruit can rest. The central support surface 264 is integrally formed with the downwardly extending leg 65 which is of the kind described in earlier embodiments. The platform 260 is pivotally supported about the spaced apart webs on the chain clip 140 about a rod 269 adjacent one edge of the platform as shown in FIG. 12 so that release of the leg 65 causes the platform 260 to pivot downwardly to the dotted profile shown in FIG. 12. To ensure separation of the fruit, each platform 260 is also provided with a forwardly mounted idler roller 280 that is free to spin between a pair of upstanding arms 281 and 282 formed on a forwardly projecting flange 283. The idler roller 280 is positioned with its axis rotation as shown in FIG. 12, above the axis of rotation of the concave rollers 261 and 262. The idler roller 280 prevents fruit from nestling between each platform set and ensures that a single piece of fruit is supported on each platform.

Figure 16:
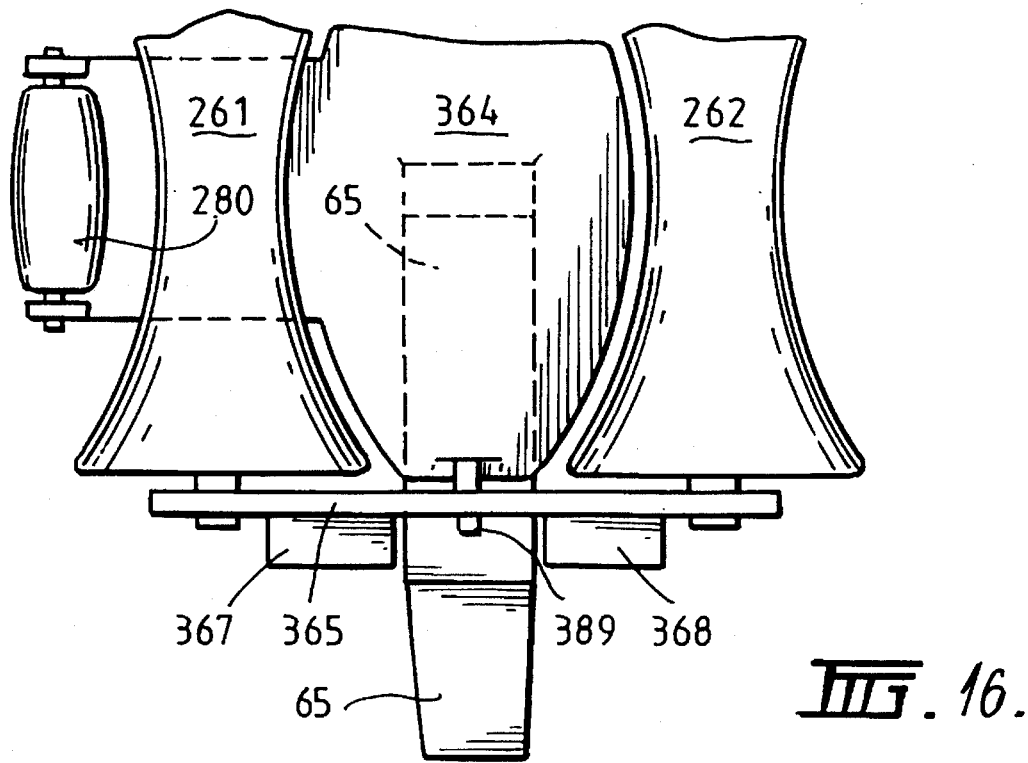
FIG. 16 is a plan view of the pair of rollers of FIG. 14 when supported by the conveyor.
Figure 14:
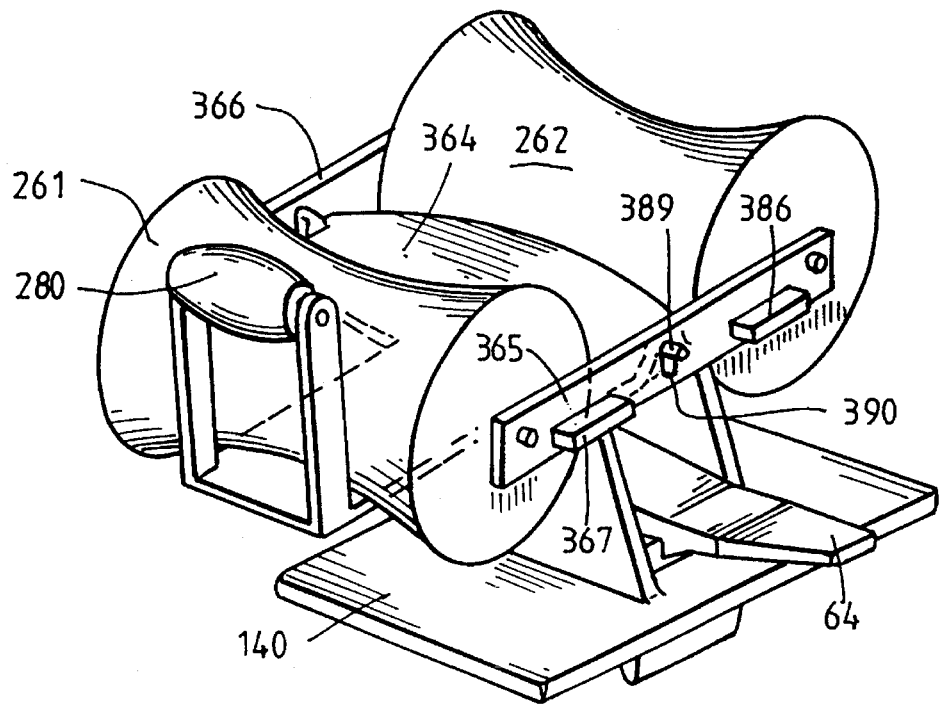
FIG. 14 is a perspective view of a pair of rollers incorporating a floating linkage.
Figure 15:
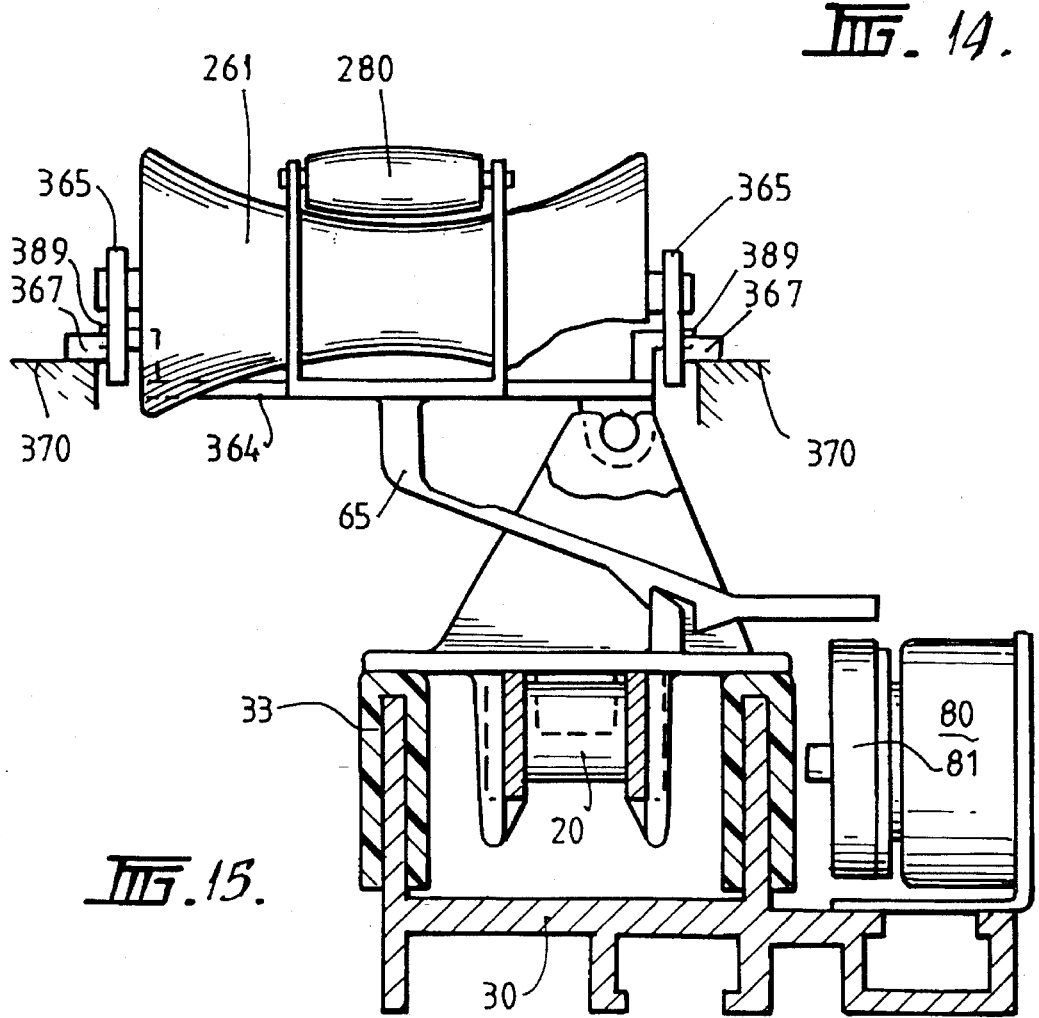
FIG. 15 is a cross-sectional view of the conveyor illustrating the support of the pair of rollers of FIG. 14.

In the embodiment of FIGS. 14 to 16, the platform arrangement 260 is provided with a floating linkage to allow the arrangement to be weighed so that the weight of the fruit can be ascertained.

The floating linkage of the platform of the embodiments of FIGS. 14 to 16 is provided by attaching the central support surface 364 to the side panels 365, 366 through pins 389 that are floatingly located in vertically extending elongate slots 390 in the side panels. In this manner, the side panels and rollers 261, 262, and thus fruit supported thereon, are supported directly through the pin contact and the platform has a capacity to float relative to the support surface 364. As shown in FIG. 5, the elongate side panels 365, 366 are each provided with load bearing projections 367, 368 that ride on weight sensors 370 forming part of the conveyor. In this way, the mass of the fruit and roller assemblies is transmitted through the load bearing projections onto the sensors to weigh the contents of the assembly. In a manner similar to the embodiment of FIGS. 8 to 10, the weight sensors lift the platform a few millimeters to cause the pins 389 to float at the mid-span of the slots 390 to ensure that all the weight of the platform and its contents is sensed by the weight sensors 370. The discharge and pivoting action is the same as in the previous embodiment, except that the weighing surface of the conveyor would be clear of its contact with the load bearing flanges when in the tipping position.

In all embodiments, the conveyor would have suitable ramping means not shown to urge the support platforms, cups or fingers back to the horizontal position with the legs clipped against the chain clips.

The embodiments described above allow the conveyor to size, blemish check, weigh and sort a large variety of fruit and vegetables. The componentry especially the chain clips and conveyor platforms has been designed to facilitate simplicity and versatility.

We claim:

1. A support and discharge mechanism for use with a conveyor that sorts, sizes and/or weighs foodstuffs, the mechanism comprising a carriage moulded in plastics and adapted to clip onto a link of a chain of a conveyor, the carriage pivotally supporting a support platform adjacent one edge of the platform, the platform being adapted to support foodstuffs to be transported by the conveyor, the platform having an integrally formed downwardly extending leg that resiliently clips onto the carriage, the leg terminating in a projecting foot whereby an upward force on the foot causes the leg to resiliently disengage from the carriage causing the platform to pivot downwardly relative to the carriage to discharge foodstuffs supported by the platform.

2. The support and discharge mechanism according to claim 1 wherein the leg joins the underside of the support platform at a position spaced from the pivotal location of the platform on the carriage, the leg when resiliently clipped onto the carriage acting as a supporting truss to hold the platform in an operative position in which it can support foodstuff.

3. The support and discharge mechanism according to claim 1 wherein the carriage has an upward projection which is arranged to locate in a slot on the underside of the leg to support the platform in the operative position.

4. The support and discharge mechanism according to claim 3 wherein the leg is resilient to enable the leg to pivot upwardly relative to the platform to effect disengagement of the projection from the slot.

5. The support and discharge mechanism according to claim 3 wherein the underside of the leg is provided with inclined ramps on either side of the slot allowing the projection on the carriage to ride up a ramp and resiliently locate within the slot.

6. The support and discharge mechanism according to claim 1 wherein a solenoid having a rotating lever is positioned adjacent the underside of the foot of the leg of the mechanism, whereby activation of the solenoid causes the lever to push the foot upwardly to release the leg.

7. The support and discharge mechanism according to claim 1 wherein the support platform comprising a plurality of elongate fingers pivotally supported by the carriage in a mutually parallel array.

8. The support and discharge mechanism according to claim 1 wherein the support platform comprises an inwardly dished cup, one side of which is pivotally supported by the carriage.

9. The support and discharge mechanism according to claim 1 wherein the support platform comprises a support spindle integrally formed with the leg and a dished cup pivotally supported by the support spindle to have a capacity to float vertically whereby, in use, the platform can ride on a load sensor forming part of the conveyor.

10. The support and discharge mechanism according to claim 1 wherein the support platform comprises a frame adapted to support a pair of axially rotatable rollers spaced apart to define a gap onto which foodstuff may be located.

11. The support and discharge mechanism according to claim 10 wherein the frame comprises a pair of parallel spaced apart side plates, the side plates supporting the rollers for axial rotation thereabout, the side plates having a vertical slot to which engages a horizontal spindle that forms part of the support platform, the spindle being directly connected to the leg and pivotally supported by the carriage whereby the side plates and rollers have a capacity to float vertically about the spindle so that the side plates and rollers can rest on a weight sensor forming part of the conveyor.

12. The support and discharge mechanism according to claim 10 wherein an idler roller is positioned adjacent one end of the frame to prevent foodstuff lodging between adjacent frames.

13. A conveyor comprising an endless chain driven by spaced drive sprockets, the chain comprising a plurality of interconnecting chain links, and a plurality of support and discharge mechanisms each comprising a carriage molded in plastics and adapted to clip onto a link of the chain of a conveyor, the carriage pivotally supporting a support platform adjacent one edge of the platform, the platform being adapted to support foodstuffs to be transported by the conveyor, the platform having an integrally formed downwardly extending leg that resiliently clips onto the carriage, the leg terminating in a projecting foot whereby an upward force on the foot causes the leg to resiliently disengage from the carriage causing the platform to pivot downwardly relative to the carriage to discharge foodstuffs supported by the platform, the plurality of support and discharge mechanisms defining a conveying surface on which a line of foodstuffs may be located, the conveyor further including a discharge mechanism that periodically releases the foot of one of the supports and a discharge mechanism to discharge foodstuffs supported thereon.

\* \* \* \* \*